Aug. 19, 1930.　　　J. A. SPENCER　　　1,773,698
TEMPERATURE CONTROLLING APPARATUS
Original Filed Nov. 13, 1925　　4 Sheets-Sheet 1
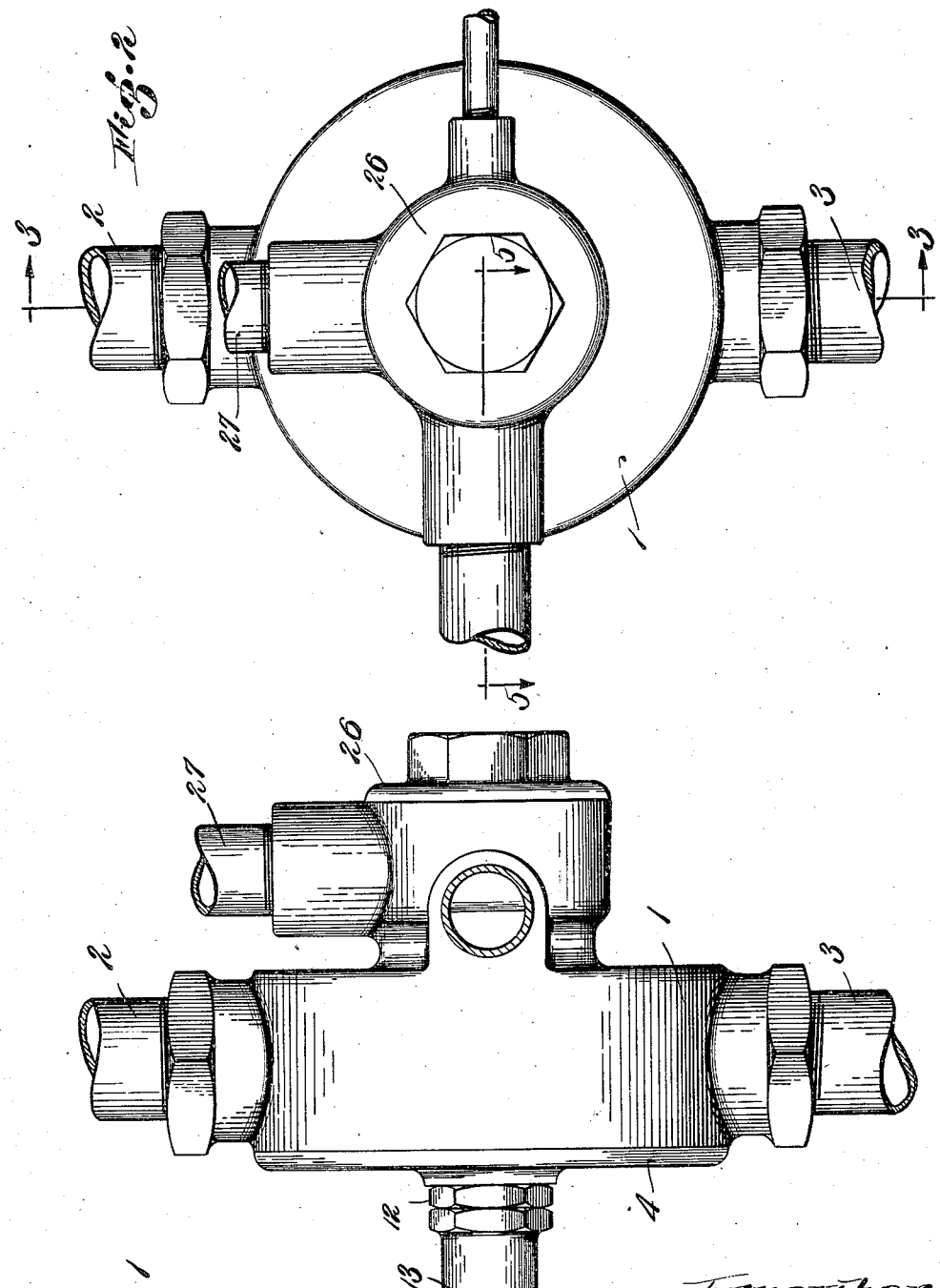

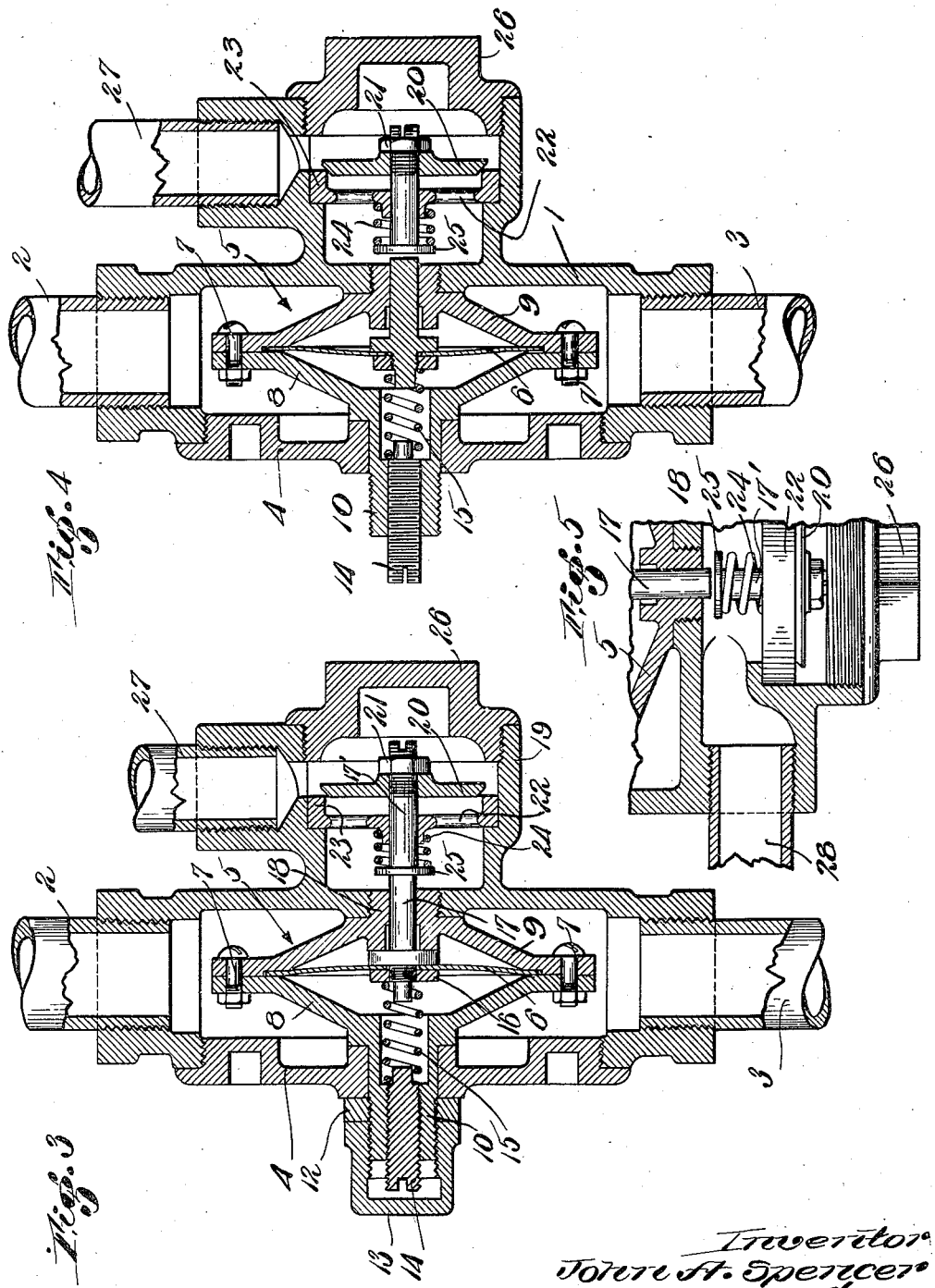

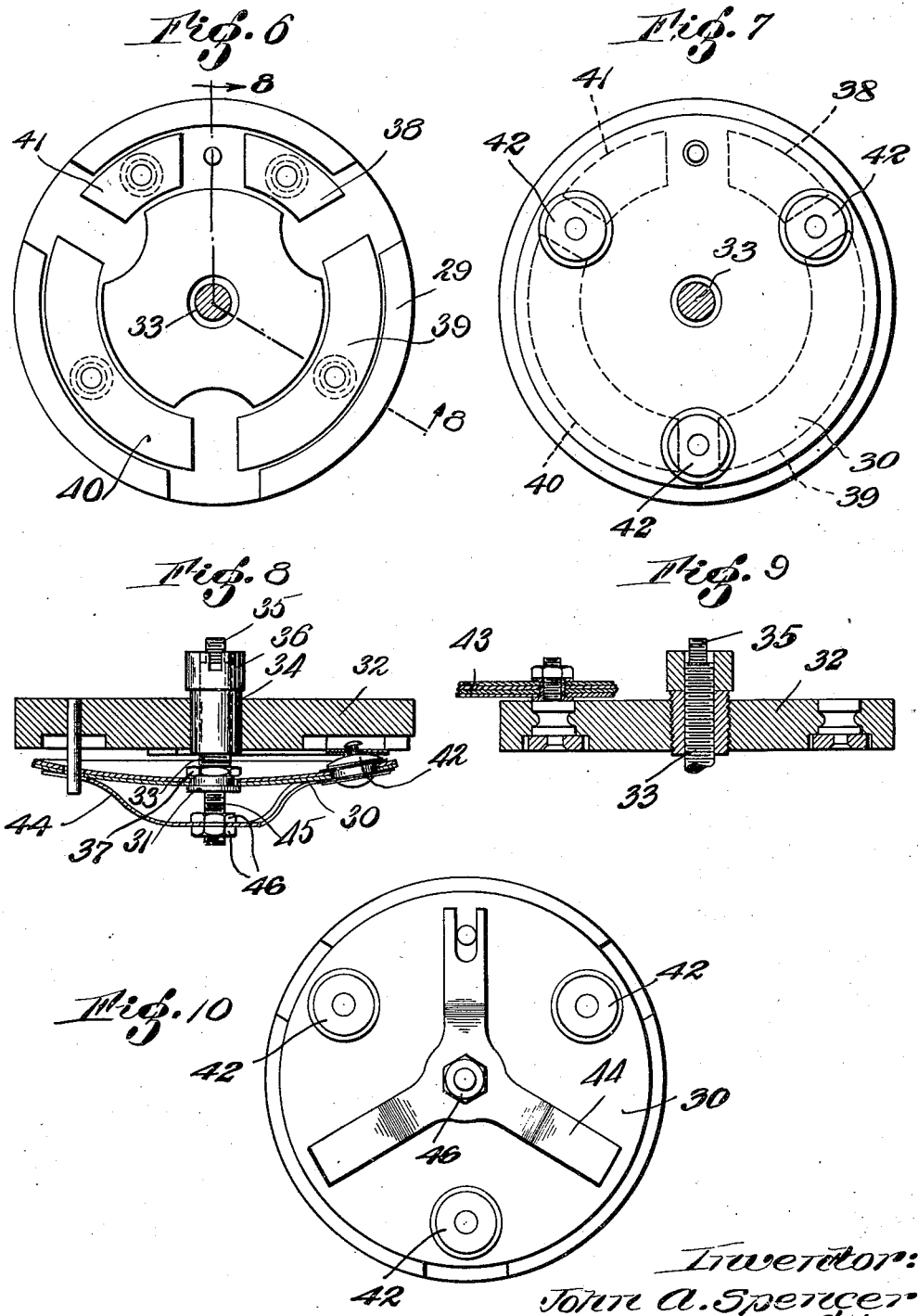

Patented Aug. 19, 1930

1,773,698

UNITED STATES PATENT OFFICE

JOHN A. SPENCER, OF NEWTON, MASSACHUSETTS, ASSIGNOR TO SPENCER THERMOSTAT COMPANY, OF CAMBRIDGE, MASSACHUSETTS, A CORPORATION OF MASSACHUSETTS

TEMPERATURE-CONTROLLING APPARATUS

Application filed November 13, 1925, Serial No. 68,883. Renewed July 20, 1928.

This invention relates to temperature controlling apparatus in which a thermostatic device, sensitive to changes in temperature, is adapted to be adjusted so that it is effective over a wide or narrow range of temperature limits, as desired.

Prior to this invention thermostats have been embodied in heating devices to control the temperature thereof, but all said thermostats fail to provide a control of temperature over variable temperature limits. In the case of an electric iron, in which one embodiment of this invention is illustrated, it frequently happens that the temperature of the iron desirable for ironing a damp piece of material is too hot for use on a relatively dry piece of material so that it is necessary that an iron be of different temperatures to be suitable for ironing different materials. When it is desired to have an iron at a temperature less than the maximum temperature permitted by the thermostat it has heretofore been necessary to allow the iron to heat up to its maximum and then cool to the desired temperature with the obvious result of great waste in heat energy and time.

In another field for this invention, namely in hot water systems which are thermostatically controlled, the thermostat is adapted to turn on the gas or heating medium when the water is relatively cool, and conversely turn off the gas when the water has become relatively hot. There is, therefore, a predetermined temperature range over which the thermostat remains in a fixed position. If, for instance, the thermostat is adapted to supply heat when the temperature of the water is only 150° F. and to cut off the heat when the temperature of the water reaches 200° F. it will be clear that the actual temperature of the water will constantly range between 200° and 150° F. It may be that water is desired at a temperature between the limits of 212° and 200° F.

Objects of this invention are to provide a temperature controlling device whereby the range of temperature may be easily and adequately adjusted to provide temperature regulation within a narrow range; to provide a device in which adjustable thrust and stop members act on a thermostat, separately or conjointly, to make it more sensitive to temperature changes; and to provide a device simple in its operation, easily adjustable, and inexpensive.

These objects are obtained by using a stop on one or both sides of a member constructed to change shape upon change of temperature, preferably a thermostatic element of the snap-acting type claimed in my Patent No. 1,491,363, granted April 22, 1924.

Instead of making the stops rigid so that they merely restrict movement of the thermostatic element (or in the case of my snap thermostats merely prevent the disk from assuming normal curvature) they are preferably yielding so that they not only limit movement but exert a yielding force upon the disk or other element during a part or all of its travel from one shape or position to its other extreme shape or position. If it is desired to vary the temperature range of the device the stops may be made adjustable.

Other objects of the invention will be manifest from the detailed description hereinafter set forth.

In the accompanying drawings illustrating certain embodiments of the invention;

Fig. 1 is a view in elevation of the housing enclosing a temperature controlling device of a heating system for hot water;

Fig. 2 is a plan view of Fig. 1;

Fig. 3 is a vertical section on the line 3—3 of Fig. 2 showing the temperature controlling device in the open position of a fuel valve;

Fig. 4 is a view similar to the view shown in Fig. 3 with certain parts eliminated, and showing the fuel valve in closed position;

Fig. 5 is a horizontal section on the line 5—5 of Fig. 2;

Fig. 6 is a horizontal detail section taken in a sadiron (not shown per se), the view showing spaced conducting segments with gaps therebetween;

Fig. 7 is a view similar to the view shown in Fig. 6 with the conducting segments bridged by conducting elements;

Fig. 8 is a vertical sectional view on the line 8—8 of Fig. 6 showing a spring pressed snap thermostatic element;

Fig. 9 is a vertical section of a detail showing the resistance wires connected to one of the conducting segments;

Fig. 10 is a plan view of the detail shown in Fig. 8;

Figure 11:
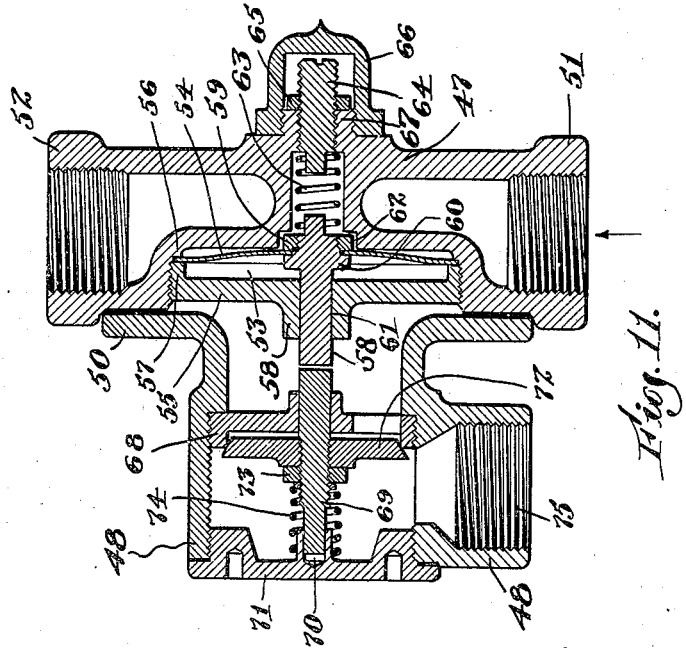
Fig. 11 is a vertical sectional view of the housing enclosing a temperature controlling device of a heating system for hot water, similar to Fig. 3 but showing another modification.

In one embodiment of the invention as illustrated in Figs. 1 to 5 inclusive, the numeral 1 designates a housing in a hot water heating system which receives at one end an inlet pipe 2 leading from the hot water tank (not shown) and is provided, at its other end, with an outlet pipe 3 leading to the various service pipes for the distribution of the water. A removable cover 4 is adapted to permit entrance within the housing member 1 and located therein is an inner housing 5, enclosing a thermostatic disk or sheet element 6, which is adapted to abruptly change its shape on reaching critical temperatures. The inner housing 5 comprises two plates 8 and 9 bulged at their central portions to form a hollow space therebetween of considerable magnitude and having flat engaging peripheral surfaces held in engagement by suitable bolts and nuts designated as a unit by the numeral 7, the thermostatic sheet 6 having its peripheral edge engaged by the co-operating flat edges of the plate members 8 and 9. The plate member 8 has a tubular extension 10 extending through an opening 11 in the removable cover 4. The extension 10 is externally threaded for a short distance of its length to receive a locking nut 12 and a cap member 13, and is internally threaded to receive an adjustable screw 14, which regulates the tension of the spring 15, having one end seated in a counterbore of the tubular extension 10 and its other end resting against a nut 16 in screw threaded engagement with a pin 17 which extends through the thermostatic sheet 6. The plate member 9 has a tubular externally threaded extension 18 engaging a threaded orifice in the side of the housing 1 directly opposite the cover 4. The pin 17 projects through the extension 18 and has a collar thereon located between and in engagement with the sheet 6 and one end of said extension 18. A hollow tubular projection 19 integral with the housing 1 and enclosing the fuel inlet valve 20 extends from the side of said housing and contains a pin 17'. One end of the pin 17' is externally threaded to receive the valve 20 and locking nut 21. Surrounding the pin 17' is a spider-like member 22 seated on an inner annular shoulder formed by a counterbore within the projection 19, said member 22 having an annular flange 23 forming a valve seat for the valve 20. A coil spring 24 is compressed between the hub portion of the spider member 22 surrounding the pin 17' and an integral collar 25 on said pin for the purpose of normally maintaining the valve 20 in closed position and for regulating the action of the thermostatic sheet 6 in a manner hereinafter described. A removable cover member 26 is adapted to close the housing 19 but permits access to the fuel valve 20 when desired. A fuel inlet pipe 27 in screw threaded engagement with the side wall of the housing 19 permits entrance of the fuel on one side of the valve 20 while a fuel outlet pipe 28 as shown in Fig. 5 is adapted to lead the fuel from the other side of the valve 20 to the burner (not shown).

The operation of the device is as follows: The water from the heating tank (not shown) passes through the pipe 2 into the housing 1 around the housing member 5 into the service pipe 3 for distribution. When the water passes through the housing 1 the temperature of said water affects the temperature of the thermostatic sheet 6 and causes said sheet 6 to abruptly change its shape to close the valve 20 when the high temperature limit has been reached, as shown in Fig. 4, and to again abruptly change its shape to open the valve 20 when the low temperature limit has been reached as shown in Fig. 3. The sheet 6 has predetermined flexing characteristics, such that, affected by temperature only, it will function over a limited range of temperatures. By the use of the thermostatic sheet 6 alone, it is clear that no variable temperature range is permitted, and it is, so far as now known, impossible to secure a higher temperature range or lower range. By means of the springs 15 and 24 and the stop collar member 25 it will be seen that the temperature range can be changed, inasmuch as said members provide forces acting on the thermostatic sheet 6 that vary the original stresses that were in the sheet. If, for instance, it is desired to raise the temperature range so that instead of providing water between 200° F. and 180° F., which we will assume is the normal range of the sheet 6 when affected only by temperature, water is desired between a temperature range of 212° F. and 200° F., it is only necessary to adjust the screw 14 so as to increase the compression of the spring 15. The spring 15 now provides a force on the thermostatic sheet 6 which will cause said sheet to abruptly change its shape from the position shown in Fig. 4 to open the valve 20 before it would ordinarily open when affected by temperature only. The spring 15 may be adjusted so that considerable pressure will be exerted against the sheet 6 when in the position shown in Fig. 4, and yet practically no pressure will be exerted against said sheet after the abrupt change has taken place and the valve is opened as shown in Fig. 3. This will cause the thermostatic sheet to open the valve sooner than if the spring were not provided, and the time of closing of the valve will be unaffected as the tension of the spring is relieved when the initial movement of the sheet commences and when once started the sheet will be carried onward by stresses inherent in the sheet. The spring will therefore be unable to delay the closing of the valve but is brought into tension only to hasten the opening of the valve when the temperature of the water falls, with the result that the temperature of the water will reach its ordinary high limit but its lower limit will be greatly raised and the range of temperature limits will be narrowed. If, however, the screw 14 is adjusted sufficiently to provide the spring with some tension even after the valve 20 is open, the spring will cause a further raising of the lower temperature limit but also will cause some delay in the subsequent valve closing movement and will raise the higher temperature limit, with the result that a temperature range having entirely different limits is provided. The collar 25 also serves to narrow the temperature range inasmuch as the pin 17 will strike the collar 25 with considerable force due to the instantaneous snap action of the sheet 6 and will cause the pin 17' and valve 20 attached thereto to move further than the normal position of the valve when open, with the result that on the reaction of the collar 25, pin 17' and valve 20, to the initial blow of the pin 17, the sheet 6 will be slightly displaced from its forward position with the result that said sheet is more sensitive to the temperature of the water and the temperature limits are therefore brought closer together.

This device, therefore, provides means for increasing or reducing the critical temperatures in accordance with the adjustments of the operator.

In the embodiment of the invention illustrated in Figs. 6 to 10, inclusive, the numeral 29 designates a temperature control apparatus for use in connection with a sadiron or other device in which it is desired to control the flow of an electric current to produce a definite temperature range. The flow of current through the heating circuit is controlled by a thermostatic sheet 30 similar to the sheet 6 shown in Figs. 3 and 4. This thermostatic sheet is connected at its central portion under a head 31, which in turn is joined to an insulating member 32 by a stem 33 which is threaded in a sleeve 34 molded into the insulating member 32. The stem 33 may be adjusted within the sleeve 34 to vary the position of the thermostatic sheet as a whole. This is done by the provision of an adjusting lug 35, the stem being retained in position by a keeper nut 36. A lock nut 37 is also provided on the stem 33 between which and the head 31 is held the sheet 30. The nut 37 abuts a shoulder on which the sheet 30 is mounted, so as to permit rotation of the stud 33. The insulating support 32 is provided with a series of spaced stationary contact plates 38, 39, 40 and 41 disposed in circular formation on its under side and adapted to be bridged by contact members 42 carried upon the marginal portion of the thermostatic sheet 30 but insulated therefrom. The contact plates 38 and 41 are connected with suitable terminals such as the terminal 43 (Fig. 9) and the circuit is closed by the snap action of the thermostatic sheet 30 causing the contact members 42 to bridge the gaps between the spaced contact plates all of which structure is fully disclosed in copending application No. 565,255 filed June 1, 1922.

In order to vary the temperature range of the sadiron a crowfoot spring 44 is centrally mounted on a threaded stem 45, which stem 45 is in screw threaded engagement with the stem 33, suitable locking nuts 46 being provided on opposite sides of the crowfoot spring to retain said spring in adjusted position on the stem 45.

The spring 44 is adapted to function in the same manner as the spring 15, Figs. 3 and 4. While the crowfoot spring has been shown as placed on the side of the thermostatic disk to increase the operating temperature, it will be apparent that the spring might be oppositely placed to decrease the operating temperature. Also springs of different tension and length may be employed to regulate the timing of the thermostatic sheet in order to adjust the device to meet all exigencies of use.

Figure 12:
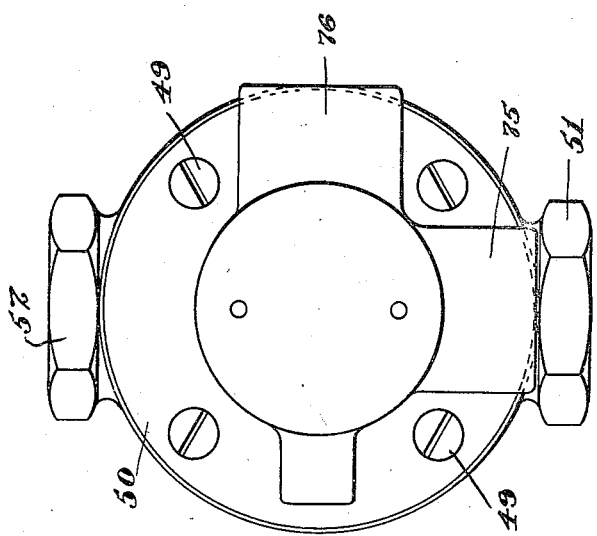
Fig. 12 is an end view taken on Fig. 11.

In the embodiment of the invention illustrated in Figs. 11 and 12, the housing is comprised of sections 47 and 48 fastened together by bolts 49 extending through a flange 50 provided on one of the sections and screw threaded into sockets formed in the other member. Upon one end of the section 47 an inlet 51 connects the housing with a pipe leading to the hot water heater (not shown), and an outlet 52 on the other end leads to the service pipes. Between the inlet and outlet this section is depressed to provide on the exterior surface an annular recess 53 for housing a thermostatic disk 54, which is retained therein by means of a guide holder 55 screw threaded with the section and clamping the peripheral margin against the section. In order to allow ample space for the movement of the thermostatic disk, a ledge 56, against which the disk is clamped, is raised above the bottom of the recess, and the holding member is provided with an annular flange 57.

The center of the thermostatic disk is apertured to receive a guide pin 58, inserted and fixed at one end to the disk by means of a nut 59 clamping it against a flange 60 formed on the pin. The other end of the pin extends through an opening 61 in the guide holder and co-operates with valve mechanism housed within the other section of the housing. Clamping nut 59 moves in a recess 62 provided in the section and seats one end of spring 63 whose tension is adjusted by a tool actuable screw 64 and retained in position by lock nut 65. A cap nut 66 is threaded to the section by a projection 67 and encloses the adjusting mechanism.

The section 48 houses a valve unit comprising a valve seat 68, removably attached to the section, and a valve stem 69 which projects through the valve seat in axial alignment with the thermostatic stem. The valve seat is centrally apertured to guide the valve stem at one end, and which is further guided at the other end by the annular socket 70 formed on the closure cap 71. The cap is detachably mounted on the section for giving access to the interior of the housing. Upon the valve stem a valve disk 72 is adjustably positioned and secured by a lock nut 73, also movable upon the valve stem. A coil spring 74 surrounds the valve stem between the valve disk and closure cap and is compressed to maintain the valve normally closed. This housing section is further provided with a fuel inlet 75 on one side of the valve for connection with a feed pipe and on the other side of the valve with an outlet 76 for connection to the burner.

As in the case of springs 15 and 24 of Figs. 3 and 4, the tension of springs 63 and 74 may be adjusted, independently and relatively to each other, to suit different conditions, typical adjustments having been described in connection with Figs. 3 and 4.

From the above description it will be apparent that a thermostatic device capable of being adjusted to vary temperature ranges is provided and although said device is shown in connection with a hot water heating system and a sadiron it is not intended to be limited to such devices but is capable of varying temperature limits wherever a temperature controlling device may be employed.

I claim:

1. A thermostatic device comprising a cupped, bimetallic disk, adjustable means providing a force acting on the disk in one direction, and adjustable means providing a force acting on the disk opposite to the first mentioned force, whereby the temperature range over which the disk will abruptly change shape is varied.

2. A thermostatic device comprising a bimetallic member constructed to change shape suddenly upon change of temperature, and adjustable means for exerting an elastic pressure upon each side of said member to affect both temperature limits of said member.

3. In a thermostatic control a casing having a valve seat therein, a valve adapted to cooperate with said seat, a cupped disk within said casing, means for supporting the peripheral portion of said disk, said disk and valve being located in substantially parallel planes, said valve having a valve stem serving to transmit a mechanical impulse from the center of said disk to said valve, a spring member exerting a force on said disk in such a direction as to tend to open said valve, and means for adjusting the force exerted by said spring member whereby the distance between said disk and the end of said valve stem may be adjusted.

4. A thermostatically controlled valve comprising a casing having a valve seat therein, a valve cooperating with said seat, said valve having a valve stem, a cupped, bimetallic disk within said casing, means for supporting said disk at the peripheral portion, said supporting means completely surrounding said disk and isolating it from the material going through the valve and means for transmitting an impulse from said disk to said valve.

5. A thermostatically controlled valve comprising a casing having a valve seat therein, a valve adapted to cooperate with said seat, a snap-acting, bimetallic thermostat supported within the casing having two positions of stable equilibrium and an intermediate position of unstable equilibrium, means for transmitting a mechanical impulse from said thermostatic element to said valve, said means including an air gap whereby creepage of said thermostatic member has substantially no effect on the valve.

6. In a thermostatic control a cupped, resilient disk, a valve, means for transmitting a mechanical impulse from said disk to said valve, said means including an air gap whereby creepage of the disk is taken up before the valve is operated.

7. In a thermostatic control a cupped, resilient disk, means for supporting said disk at its peripheral portion, a valve, means for transmitting a mechanical impulse from the center of said disk to said valve, said means including a gap whereby creepage of the disk is taken up without changing the position of the valve.

8. In a thermostatic control a cupped, resilient disk, means for supporting said disk at its peripheral portion, a valve, said valve having a stem and means for transmitting a mechanical impulse from the center of said disk to said valve stem, said means including an adjustable gap whereby creepage of the disk is taken up.

Signed by me at Boston, Massachusetts this twenty-first day of October 1925.

JOHN A. SPENCER.